Aug. 7, 1945.　　　R. J. WILLIAMS　　　2,381,850
METHOD OF MAKING BAG BODIES
Filed June 7, 1943　　3 Sheets-Sheet 1

INVENTOR
RUSSELL J. WILLIAMS
By Paul, Paul & Moore
ATTORNEYS

Aug. 7, 1945.    R. J. WILLIAMS    2,381,850
METHOD OF MAKING BAG BODIES
Filed June 7, 1943    3 Sheets-Sheet 2

INVENTOR
RUSSELL J. WILLIAMS
By Paul, Paul & Moore
ATTORNEYS

INVENTOR
RUSSELL J. WILLIAMS
ATTORNEYS

Patented Aug. 7, 1945

2,381,850

UNITED STATES PATENT OFFICE 2,381,850

METHOD OF MAKING BAG BODIES

Russell J. Williams, St. Louis, Mo., assignor to Bemis Bro. Bag Co., Minneapolis, Minn., a corporation of Missouri Application June 7, 1943, Serial No. 489,933

1 Claim. (Cl. 93—35)

This invention relates to new and useful improvements in flexible walled bag structures, as for example, paper bags.

An important object of the present invention is to provide a simple method of making a bag structure or container whose body is substantially square or rectangular in cross section.

A further object of the invention is to provide a novel method of making bag bodies which consists in slipping or pulling an empty flat bag body over an expandable mandrel while the latter is contracted, and then expanding the mandrel against the edge walls of the tubular bag body whereby the bag body is expanded and shaped and whereby triangular flaps are provided at opposite sides of the bag body, adhering said flaps against their respective edge walls, contracting the mandrel and simultaneously intucking the side walls between the edge walls while the bag is still supported on the mandrel, and subsequently pressing all of said walls into flatwise relation.

Other objects of the invention reside in the unique manner of intucking the side and bottom walls between the edge walls when contracting the mandrel, whereby the edge walls may be pressed into flatwise relation with the bottom and side walls intucked therebetween; and in the simple and inexpensive manner of folding the walls of an unscored flat bag body into flatwise relation with oppositely disposed walls intucked between the other upright walls of the bag body to reduce the overall size of the empty bag whereby it will require less storage space, and also whereby the bag body is so creased that when subsequently expanded to receive a charge, it will be substantially square in cross section, thereby providing a very neat and attractive bag when filled and sealed.

Other objects of the invention will appear from the following description and the accompanying drawings and will be pointed out in the annexed claim.

In the accompanying drawings there has been disclosed a structure designed to carry out the various objects of the invention, but it is to be understood that the invention is not confined to the exact features shown, as various changes may be made within the scope of the claim which follows.

Figure 1:
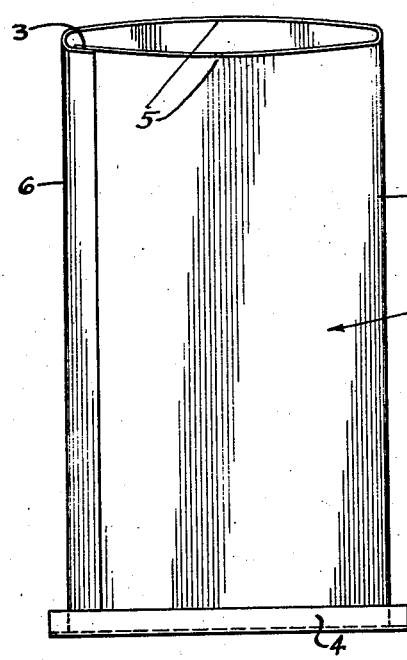
Figure 1 is a view showing a tubular bag blank having one end closed by the application of a strip of sealing tape to provide the bottom of the bag.

In the selected embodiment of the invention herein disclosed, there is illustrated in Figure 1, a tubular bag body blank, generally designated by the numeral 2, which is formed by folding a blank of sheet material upon itself with opposite edges overlapped, as shown at 3, and suitably adhered together to provide a tubular blank. A strip of sealing tape 4 is next folded over the marginal edges of the one end of the tubular blank 2 to close and seal said end and to complete the formation of a flat bag body.

An important feature of the present invention resides in the unique manner of folding the walls of an unscored flat bag body into flatwise relation with the side walls 5—5 intucked between the edge walls 6—6, whereby the walls of the bag body are so creased that when the empty bag body is subsequently expanded to receive a charge, the bag body will be substantially square in cross section and will be very neat and attractive in appearance and of such shape as to readily lend itself for packing in large containers, or on shelves without loss of storage space.

Figure 4:
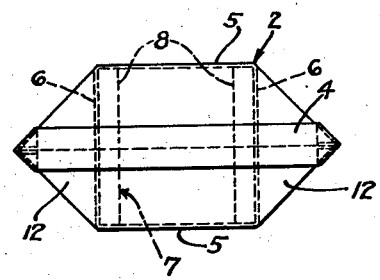
Figure 4 is a view showing the mandrel expanded to square the bag body.
Figure 6:
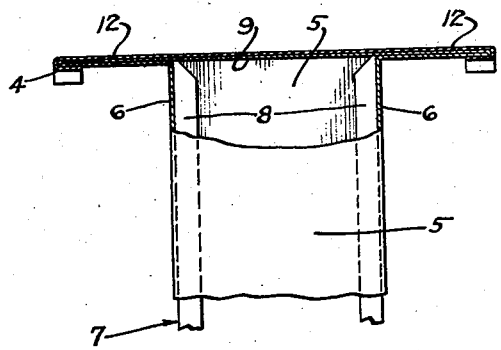
Figure 6 is a side view of Figure 4, showing the mandrel expanded and the bottom wall of the bag flattened against the upper edges of the relatively movable elements of the mandrel with the flaps extending laterally from the bag body.
Figure 7:
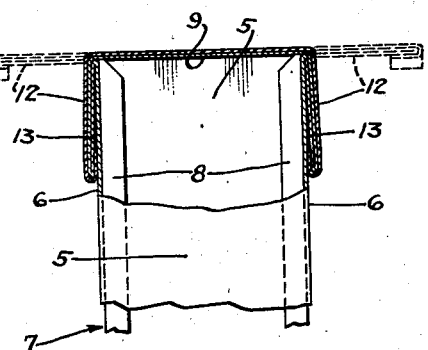
Figure 7 is a view similar to Figure 6 showing the flaps folded into engagement with the edge walls and adhered thereto.

To thus fold the walls of the bag body into flatwise relation with the side walls intucked between the edge walls, the flattened bag body is pulled or fitted over an expandable mandrel, generally designated by the numeral 7. The mandrel is shown comprising a pair of relatively movable blades or elements 8—8 supported upon a suitable operating device, not shown in the drawings, whereby the blades 8—8 may be outwardly moved with respect to each other, as shown in Figures 4, 6 and 7, against the edge walls 6 of the bag body, thereby to square the bag body as shown in Figure 4.

Figure 5:
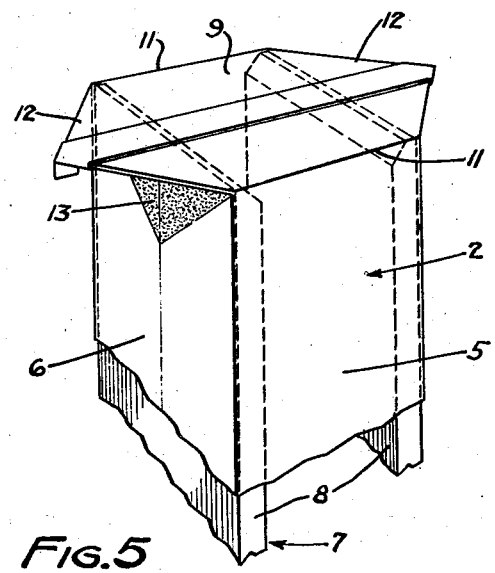
Figure 5 is a perspective view of the upper portion of Figure 4, showing the flaps provided as a result of expanding the mandrel against the edge walls of the bag body.

When the mandrel is expanded against the edge walls of the bag body, the edge and side walls are made taut and simultaneously the bottom wall 9 is formed as result of the development of fold lines 11 at the juncture between the side walls 2 and bottom wall 9, as will readily be understood by reference to Figure 5. When the bottom wall 9 is thus formed, a pair of oppositely extending triangular flaps 12—12 are simultaneously formed, as shown in Figures 5 and 6, which flaps are subsequently folded downwardly into engagement with their respective edge walls 6 and adhered thereto by a suitable adhesive, indicated at 13 in Figures 5, 7 and 8.

Figure 10:
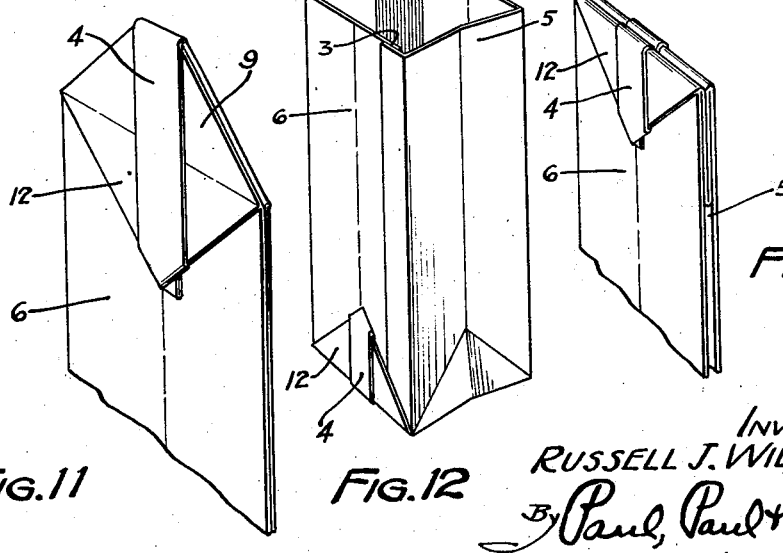
Figure 10 is a view showing the bag body completely removed from the mandrel and having its bottom and side walls intucked between the edge walls.

When the flaps 12 have thus been secured to their respective side walls 6, the mandrel is contracted, and simultaneously the bottom and side walls 9 and 5, respectively, are intucked between the edge walls 6, whereby when the bag body is removed from the contracted mandrel, all of the bag walls may readily be folded into flatwise relation with the bottom and side walls intucked between the edge walls, as shown in Figure 10, thereby greatly reducing the overall size of the empty bag body, whereby it may be stored in a relatively smaller space.

Figure 12:
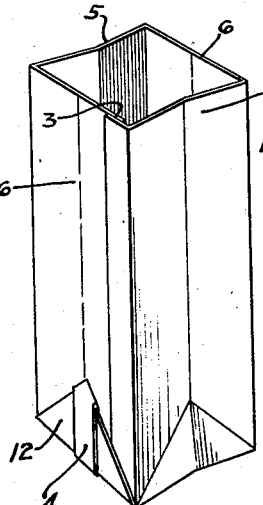
Figure 12 is a view showing a bag body made in accordance with the present invention, expanded to receive a charge.

By intucking the bottom and side walls between the edge walls, as above described, the walls of the flat bag body are so creased that when the bag is subsequently expanded to receive a charge, as shown in Figure 12, the bag body will be substantially squared in cross section. This is a very desirable feature in that when the bag is filled and its top is closed and sealed, the sealed bag will be very neat and attractive in appearance, and will be so shaped that it will readily lend itself for storage and packaging in a comparatively small space.

Figure 11:
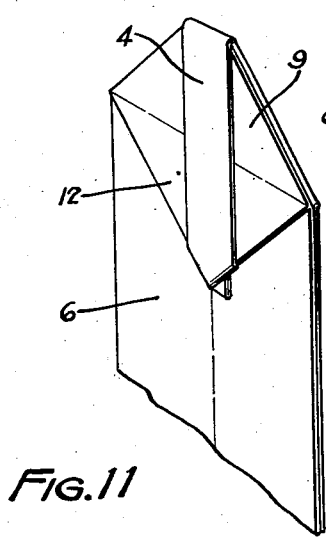
Figure 11 is a view similar to Figure 10 but wherein the bottom wall is not intucked between the edge walls.

In Figure 11 I have shown a completed bag body wherein the side walls only are intucked between the edge walls. In the form here shown, it will be noted that the bottom wall 9 extends outwardly from the lower end of the bag body instead of being intucked between the edge walls as shown in Figure 10. The bag shown in Figure 11, when subsequently filled and sealed, will be identical in shape to the bag shown in Figure 10.

Figure 2:
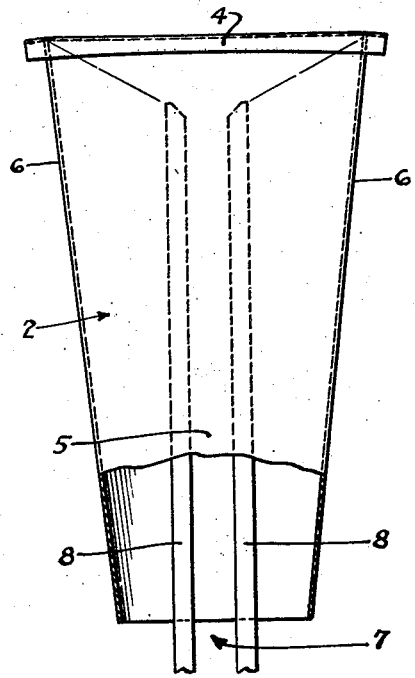
Figure 2 is a view showing the first step in squaring or shaping the bag body by positioning the bag body over an expandable mandrel when the latter is contracted.
Figure 3:
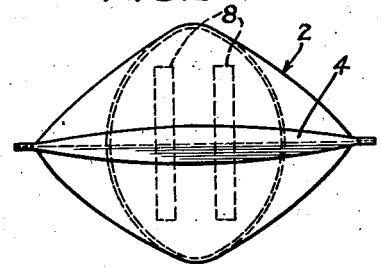
Figure 3 is a top view of Figure 2.
Figure 8:
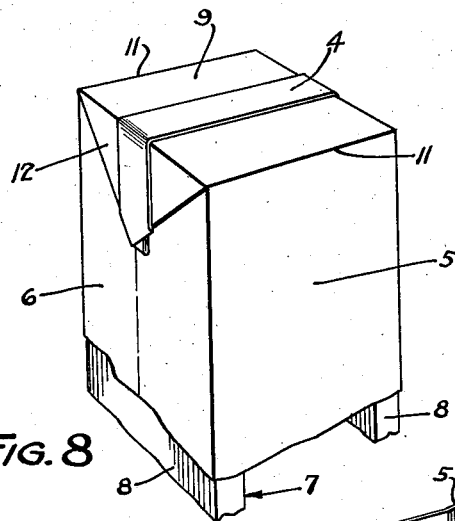
Figure 8 is a perspective view of the bottom portion of the bag when in the form shown in Figure 7.
Figure 9:
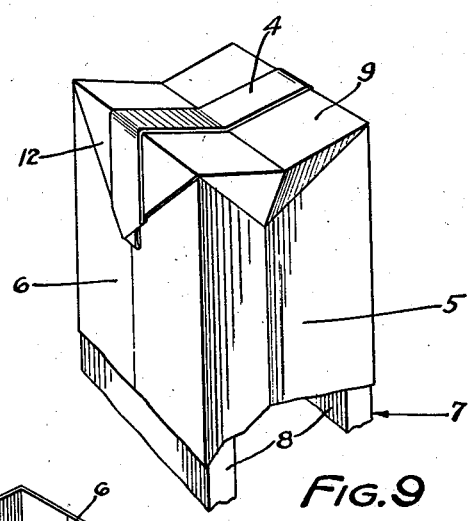
Figure 9 is a view showing the side and bottom walls partially intucked between the edge walls as the mandrel is contracted, prior to removing the bag from the mandrel.
Figure 13:
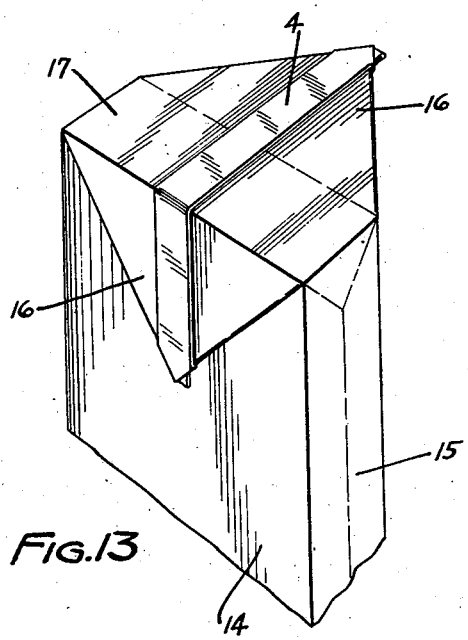
Figure 13 is a perspective view showing the invention embodied in a bag having a rectangular or relatively flat body.
Figure 14:
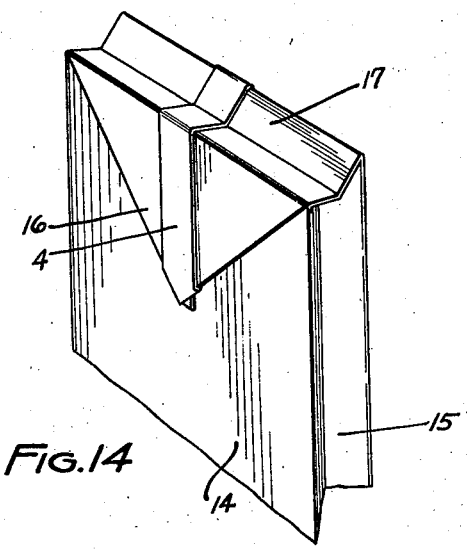
Figure 14 is a perspective view of the bag shown in Figure 13, partially collapsed.
Figure 15:
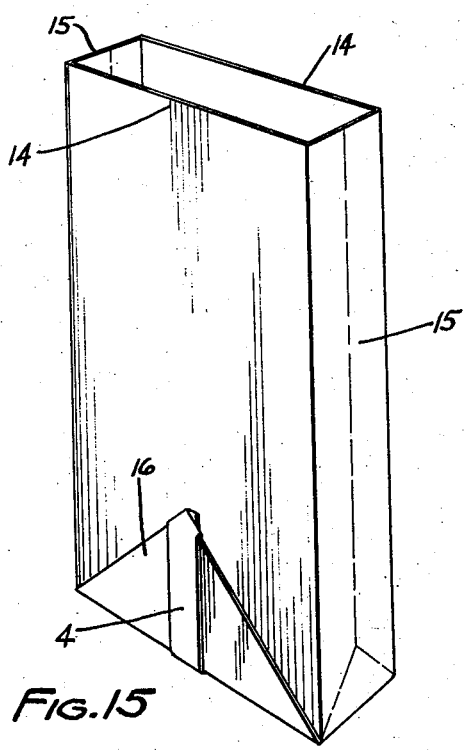
Figure 15 is a view showing a completed bag of the type shown in Figure 13.

In Figures 13 and 14 there is shown a bag body similar to the one illustrated in Figures 8 and 9, except that the bag body is rectangular in cross section, or is relatively longer in one direction than in the other. In the form here shown the so-called edge walls of the bag body are considerably wider than the so-called side walls 15. The triangular flaps 16 shown in Figures 13, 14 and 15, and the shaping of the bag body is accomplished by slipping the empty flat bag over a mandrel similar to the one illustrated in Figure 2.

Figure 16:
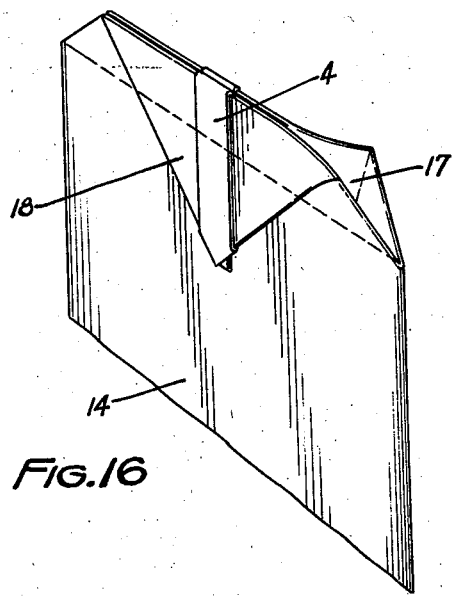
Figure 16 is a perspective view showing the invention embodied in a flat type bag.

The invention may also be applied to flat type bags which are distinguished from the other forms of bags herein disclosed in that the side walls are not intucked between the edge walls, as shown in Figures 1 to 12, inclusive. In Figure 16 I have shown a flat bag in which the bottom wall 17 is intucked between the other walls of the bag body in the formation of the triangular flaps 18 in the operation of forming the bag body.

In the drawings, I have shown a very simple and inexpensive mandrel for carrying out the novel method of squaring or shaping flat bag bodies, as herein disclosed, and whereby the bag bodies may be creased to facilitate folding and shaping without the use of scoring blades for scoring the bag walls prior to folding, which greatly simplifies the mechanism required for squaring or shaping flat bag bodies.

In Figure 5 I have shown the triangular flaps 12 secured to their respective edge walls by a suitable paste or adhesive 13, but it is to be understood that in some instances it may be found more desirable not to adhere the flaps to their respective walls. Ordinarily, however, the flaps would be secured to the walls, as indicated in Figure 5.

It will be apparent to those skilled in the art that I have accomplished at least the principal objects of my invention, and it will also be apparent to those skilled in the art that the embodiments herein shown and described may be modified without departing from the spirit of the invention.

I claim as my invention:

A method of forming fold lines in the walls of an empty flat bag body to facilitate squaring the bag body when filled, which consists in slipping the empty bag body over a contracted mandrel comprising a pair of flat elements movable away from one another to expand the mandrel, and whereby the edge walls of the flattened bag body are disposed in the plane of movement of said elements, expanding the mandrel elements into engagement with one pair of the bag walls whereby the other pair of bag walls are placed under tension and whereby outwardly extending triangular flaps are provided at opposite sides of the bag bottom, folding said triangular flaps into engagement with said one pair of walls of the bag body and adhering them thereto, and then inwardly indenting the other pair of walls of the bag body and the bottom of the bag and pressing said one pair of said walls into flatwise relation with the other pair of walls and the bottom wall intucked between the said one pair of walls.

RUSSELL J. WILLIAMS.